Patented Aug. 19, 1952

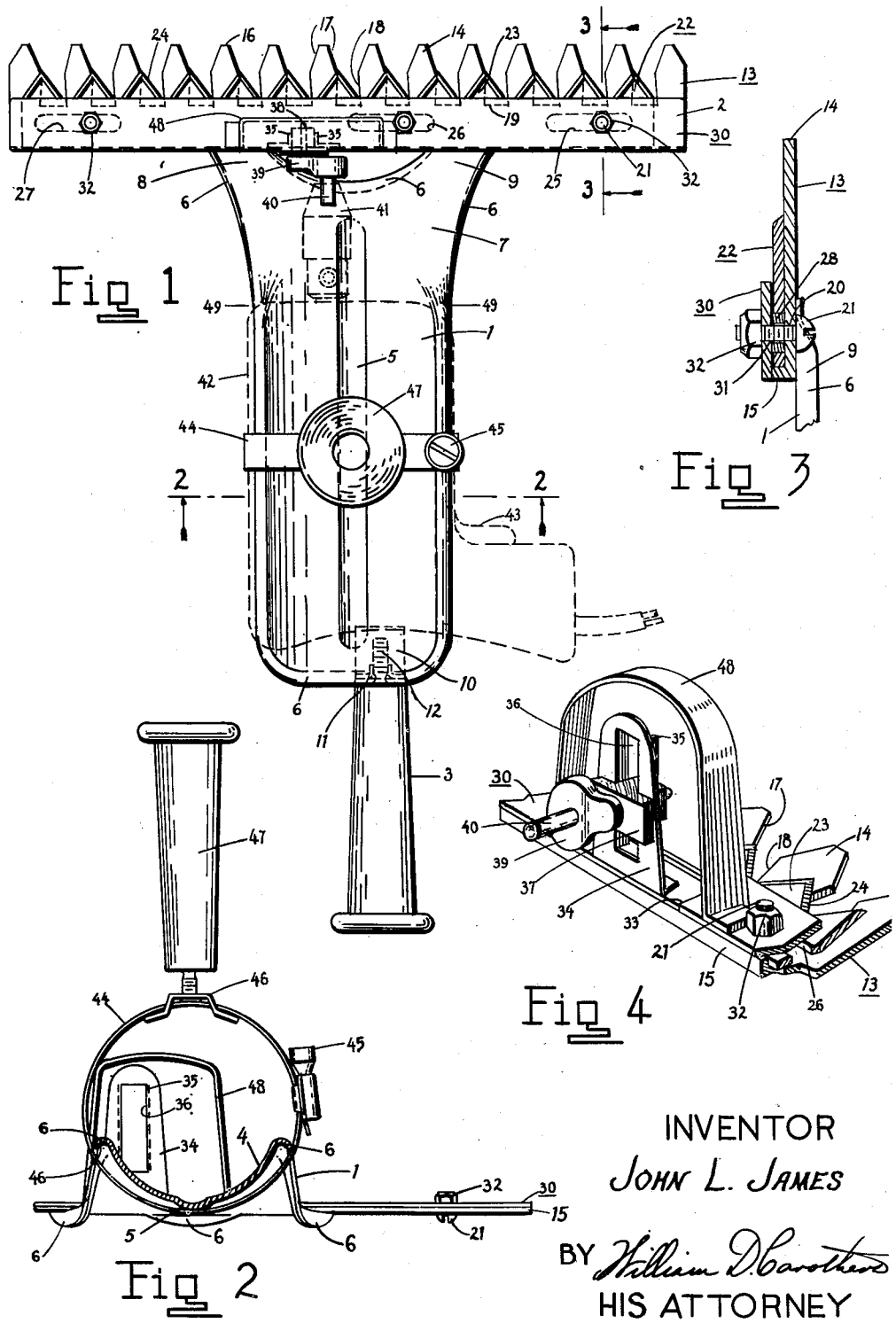

2,607,113

UNITED STATES PATENT OFFICE 2,607,113

HEDGE CLIPPER

John L. James, Pittsburgh, Pa.; Margaret C. James, Fox Chapel Borough, Allegheny County, Pa., and Mellon National Bank and Trust Company, Pittsburgh, Pa., executors of said John L. James, deceased, assignors to Edward M. Asbury, Penn Township, Allegheny County, Pa.

Application April 16, 1948, Serial No. 21,340

2 Claims. (Cl. 30—220)

This invention relates generally to portable tools and more particularly to a lawn or hedge trimming or chipping hand tool.

This invention comprises a trimming or chipping attachment that may be readily adapted to and operated by a portable drill. The attachment is constructed to receive a quarter inch portable electric drill of any manufacture and convert its rotary motion to reciprocating motion for actuating a movable cutting bar relative to a stationary cutting bar. The teeth of the cutting bars are shaped to cooperate with one another and prevent them from jamming. They readily mow a hedge or heavy strand of grass and weeds. The portable drill is readily secured to the attachment by a single fastening means which also provides a handle that facilitates the manipulation of the tool.

Other objects and advantages appear from the following description and claims.

A practical embodiment illustrating the principles of this invention is shown on the accompanying drawing wherein:

Fig. 1 is a top plan view with the trimming attachment;

Fig. 2 is a sectional view taken on the line 2—2 of Fig. 1;

Fig. 3 is a sectional view taken on the line 3—3 of Fig. 1; and

Fig. 4 is a fragmentary perspective view of the motor transmitting means between the motor and the blade.

The trimming attachment comprises the saddle member 1 which is secured at its forward edge to the mowing device 2 and is provided with a handle 3 secured at the rear thereof. For a greater part of its length the saddle 1 is dished to provide a substantially semi-circular socket 4 the bottom of which is provided with a rib 5 for the purpose of strengthening the same. Additional strength is given to the socket member by turning down the flange 6 for the full perimetral surface thereof with the exception of the foremost edges of the socket.

The forward edge of the socket is substantially flat as indicated at 7 and is provided with spaced bifurcated projections 8 and 9. The edge of the socket member between the projections 8 and 9 is likewise provided with a depending flange 6. An angle bracket 10 is welded to the underside of the rear of the saddle and is provided with a tapped hole 11 for receiving the screw 12 which is attached to the handle member 3.

The bifurcated ends 8 and 9 are welded to the lower or stationary cutter bar 13 the front edge of which is provided with the spaced forwardly projecting teeth 14 and its rear edge is provided with an upturned flange 15 as shown in Fig. 3. Each of the teeth are shaped so as to provide a blunt point 16 and rearwardly diverging sides 17 to approximately the center of the tooth where the sides then converge as illustrated at 18 to a rear edge 19 that adjoins the sides of adjacent teeth. The lower or stationary cutter bar 13 is provided with a series of three holes 20 for receiving the bolts 21 which extend upwardly therethrough.

The movable cutter bar 22 is provided with one less tooth than that of the stationary cutter bar 13. The teeth 23 on the movable cutter bar 22 are V-shaped as indicated in Fig. 1 and the edges are beveled as indicated at 24 being sharpened toward the surface of the tooth that rides against the surface of the cutter bar 13.

The movable cutter bar 22 is provided with three spaced slots 25, 26 and 27 through which the bolts 21 extend. These slots are sufficiently wide to receive a hardened steel washer 28 as shown in Fig. 3 which is smaller in diameter than the width of the slots and is thicker than the movable cutter bar 22. A top plate or guard 30 is provided with holes 31 aligned with the bolts 21 in order to receive and rest on shoulders formed on these bolts. The nuts 32 on the bolts 21 fasten the plate 30 relative to the stationary cutter bar 13. Then the plate 30 is thus secured to the stationary cutter bar and maintains a parallel relation thereto by reason of the thickness of the washers 28 and the flange 15 thereby providing a spaced guiding means or slot in which the movable cutting bar 22 is permitted to freely operate by reciprocating back and forth the full limit of the length of the slots 25, 26 and 27.

Intermediate of its ends the guard plate 30 is cut away as indicated at 33 to allow for the upstanding guideway 34 that is welded or otherwise secured to the movable blade 22. The guide member 34 comprises a sheet metal member having a flange on its lower end where it is secured to the blade 22 and is provided with a vertically disposed slot formed by cutting the metal and turning the edges outwardly as indicated at 35 thereby forming the slot 36 between the outwardly projecting parallel flanges 35. The slot 35 is arranged to receive the T-shaped bearing member 37 the head of the T riding on the face of the guide member 34 and the stem riding in slot 36. The center of the T-shaped bearing member is bored to receive a wrist pin 38 extending from one side of the crank member 39. The other side of the crank member 39 is provided with the shaft 40 arranged to be received in the chuck 41 of the portable hand drill as indicated by dotted lines at 42. The crank 39 is counterbalanced to reduce the vibration in transmitting the power from rotary to reciprocating motion.

The bearing member 37 may be made from any suitable material. However, it is preferable to employ a fibrous material such as wood which may be readily impregnated with a lubricant. It was found that a hard wood impregnated with a lubricant functions very satisfactorily as the bearing member 37.

The portable drill 42 is provided with the switch 43 that may be set to continuously run the motor. The motor is clamped in place by the strap 44 which has a screw takeup 45 and is provided with the bracket 46 for receiving the handle 47. When the portable drill is positioned on the saddle it rests on the flanged edges 6 which engage both sides of the cylindrical drill member and its handle. When the strap member 44 is taken up the portable drill is tightened on the parallel flanges 6 of the sides of the saddle and rigidly held in position the handles 3 and 47 providing a guiding member for manipulating the trimmer.

The opening 33 in the upper guard 30 is sufficiently long to permit any manufacture of a quarter inch hand drill to be mounted in the saddle and will receive the shaft 40 of the crank 39 and rotate the same to oscillate the movable blade 22 a distance greater than a single pitch of the teeth on the movable blade. A slight difference in the exact location of the chuck 41 on each of the quarter inch portable drill motors is allowed for in the height of the guide member 34.

In order to protect the operator from the rotary crank and oscillating guide member a shield 48 is mounted on the upper stationary member 30.

The edges of the saddle extending from the points 49 to the rear end thereof are straight and provide a very cradle for receiving the portable drill 42. These straight edges are made very strong owing to the radius 46 employed in forming the depending flange 6. The arc of the saddle between these straight edges is less in radius than the case of any of the portable drills so that the drills will always rest only on the straight edges of the saddle and will not engage any portion of the circular socket 4. This assures proper alignment of the drill motor on the saddle and permits it to be tightened and held by the single strap 44.

I claim:

1. A vegetation trimming attachment comprising a substantially semicylindrical motor supporting saddle member having a downwardly and forwardly projecting portion which is bifurcated, a trimming mechanism including stationary and movable cutting bars, a depending stiffening flange on the outer edge of said saddle member extending from one bifurcated projection around the whole of the saddle member to the other bifurcated projection and between said bifurcated projections, handle means attached to said saddle member, means to mount the stationary cutting bar on the bifurcated projections, means to slidably mount the movable cutting bar on the stationary cutting bar, and rotary crank means rotatably supported by the stationary bar to oscillate the movable cutting bar and having a shaft for attachment to a hand drill motor mounted in said saddle.

2. A hedge trimming attachment comprising a motor support having a stationary cutter bar, a movable cutter bar guided and slidable on the stationary cutter bar, a crosshead guide plate secured to the movable cutter bar and having a slot disposed normally to said bar, said slot being formed by inwardly bent flanges extending parallel to each other, a T-shaped lubricant-impregnated wood block the head of which is wider than said slot and slidably engages said plate with the stem extending between said flanges forming the slot, and a crank to be rotated by a motor to be placed in said support and journaled in the block to oscillate the movable blade.

JOHN L. JAMES.

REFERENCES CITED

The following references are of record in the file of this patent:

UNITED STATES PATENTS

| Number | Name | Date |
|---|---|---|
| 532,188 | Shannon | Jan. 8, 1895 |
| 1,458,250 | Staudinger | June 12, 1923 |
| 1,489,658 | Campbell | Apr. 8, 1924 |
| 1,838,690 | Lepiane | Dec. 29, 1931 |
| 2,256,779 | McHenry | Sept. 23, 1941 |
| 2,268,221 | Mischker | Dec. 30, 1941 |
| 2,458,200 | Renfroe et al. | Jan. 4, 1949 |

FOREIGN PATENTS

| Number | Country | Date |
|---|---|---|
| 7,736 | Great Britain | July 17, 1897 |